United States Patent
Chinchwadkar et al.

(10) Patent No.: US 11,132,614 B2
(45) Date of Patent: Sep. 28, 2021

(54) SYSTEMS AND METHODS FOR ESTIMATING VALIDATION TIME FOR FRAUD DETECTION RULES

(71) Applicant: Visa International Service Association, San Francisco, CA (US)

(72) Inventors: Gajanan Chinchwadkar, Foster City, CA (US); Navendu Misra, Foster City, CA (US); Sam Hamilton, Foster City, CA (US); Juharasha Shaik, Foster City, CA (US); Durga Kala, Foster City, CA (US); Ram Miryala, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 706 days.

(21) Appl. No.: 15/989,933

(22) Filed: May 25, 2018

(65) Prior Publication Data

US 2019/0362254 A1    Nov. 28, 2019

(51) Int. Cl.
*G06N 5/04* (2006.01)
*G06Q 20/40* (2012.01)
*H04L 29/08* (2006.01)

(52) U.S. Cl.
CPC ......... *G06N 5/046* (2013.01); *G06Q 20/4016* (2013.01); *H04L 67/06* (2013.01); *H04L 67/10* (2013.01)

(58) Field of Classification Search
CPC .. G06N 5/046; G06Q 20/405; G06Q 20/4016; H04L 67/06; H04L 67/10
See application file for complete search history.

(56) References Cited

U.S. PATENT DOCUMENTS 7,627,522 B2 * 12/2009 Monk .................. G06Q 10/067
                                                              705/38
8,589,285 B2 * 11/2013 Monk .................. G06Q 20/405
                                                              705/38

(Continued)

FOREIGN PATENT DOCUMENTS

| CA | 2765096 A1 * | 12/2010 | ............. G06Q 30/06 |
| WO | 2011008953 | 1/2011 | |
| WO | 2012054868 | 4/2012 | |

OTHER PUBLICATIONS

EP19176581.7, "Extended European Search Report", dated Sep. 6, 2019, 7 pages.

(Continued)

*Primary Examiner* — Kostas J Katsikis
(74) *Attorney, Agent, or Firm* — Kilpatrick Townsend & Stockton LLP

(57) ABSTRACT

Some embodiments of the present invention relate to systems and methods for estimating validation time that use an estimation of the amount of data fulfilling a rule or a set of rules. This estimation method may be more accurate because it considers how much data will match the rule versus how much data can be discarded. The disclosed systems and methods give visibility into how much time a rule set validation will take and how long the computer system will be unavailable due to the rule set being evaluated. This allows users to make better decisions about whether and when a rule set should be evaluated, and/or whether and how to modify implementation of the rule set.

18 Claims, 7 Drawing Sheets

(56) References Cited

U.S. PATENT DOCUMENTS

| | | | | |
|---|---|---|---|---|
| 8,600,873 | B2* | 12/2013 | Fisher | G06Q 30/0185 |
| | | | | 705/38 |
| 10,755,280 | B2* | 8/2020 | Bedi | G06Q 20/4016 |
| 2008/0298573 | A1* | 12/2008 | Monk | G06Q 20/405 |
| | | | | 379/189 |
| 2010/0070424 | A1* | 3/2010 | Monk | G06Q 10/067 |
| | | | | 705/318 |
| 2014/0108238 | A1 | 4/2014 | Boding | |
| 2014/0316960 | A1* | 10/2014 | Katepally | G06Q 40/02 |
| | | | | 705/35 |
| 2018/0204217 | A1* | 7/2018 | Bedi | G06Q 10/0635 |
| 2018/0349922 | A1* | 12/2018 | Carlson | G06Q 30/0254 |
| 2019/0362254 | A1* | 11/2019 | Chinchwadkar | H04L 67/10 |

OTHER PUBLICATIONS

Piatetsky-Shapiro et al., "Accurate Estimation of the Number of Tuples Satisfying a Condition", 1984, ACM, pp. 256-276.

* cited by examiner

| Node | Content |
|---|---|
| ?=?xml | version="1.0" |
| ▶ e RTDRuleFile | |
| ▲ e batchTransferControlData | |
| ▶ e RTDRule | |
| e rtdRuleID | 60538881 |
| ▶ e rtdCriteria | |
| e criteriaID | 131487 |
| e criteriaOrGroupID | 0 |
| e fieldName | panFirstDigits |
| e operation | BETWEEN |
| e fieldValue | 433430000 |
| e fieldValue | 433439999 |
| ▶ e rtdCriteria | |
| e criteriaID | 131489 |
| e criteriaOrGroupID | 0 |
| e fieldName | digCommInd |
| e operation | NOTIN |
| e fieldValue | 1 |
| ▶ e rtdAction | |
| e rtdActionCode | Decline |
| e additionalRuleAction | 00000000000000 |

FIG. 4

| Active Profiles | Transactions | Accepted | | Force Accepted | | Rejected | | Review | | Disposition | | | |
|---|---|---|---|---|---|---|---|---|---|---|---|---|---|
| | | | | | | | | | | Accepted | Rejected | EIAS | |
| Totals | 1/29 | 1127 | 68.57% | 0 | 0.00% | 254 | 15.35% | 028 | 15.13% | 1221 | 234 | 0 | |
| Profiles | | | | | | | | | | | | | |
| ▼ ACTIVE Launch Profile | 538 | 349 | 28.29% | 0 | 0.00% | 22 | 5.29% | 52 | 5.76% | 111 | 102 | 0 | |
| Rules | | Accepted | | Force Accepted | | Rejected | | Review | | Accepted | Rejected | ISAS | |
| None | | 246 | 46.72% | | | | | | | | | | |
| Transaction amount > $500 | | | | | | 1 | 0.18% | | | | | | |
| Account issued outside at billing country | | | | | | 2 | 0.37% | | | | | | |
| CVV not submitted | | | | | | 23 | 4.25% | | | | | | |
| CVV not submitted by issuer | | | | | | 2 | 0.37% | | | | | | |
| On negative list | | | | | | 45 | 8.38% | | | | | | |
| Excessive number of transactions | | | | | | | | 9 | 1.57% | 1 | | | |
| Multiple identity changes | | | | | | | | 29 | 5.39% | 9 | 4 | | |
| Geolocation inconsistencies in order | | | | | | | | 8 | 1.12% | 4 | 1 | | |
| Rule A | | | | | | | | 18 | 3.35% | 5 | 1 | | |
| Rule B | | | | | | | | 6 | 1.12% | | | | |
| Rule C | | | | | | 18 | 5.85% | | | | | | |
| Rule D | | | | | | | | | | | | | |

FIG. 7

SYSTEMS AND METHODS FOR ESTIMATING VALIDATION TIME FOR FRAUD DETECTION RULES

BACKGROUND

Oftentimes in computing systems, users wish to calculate the run time of an algorithm on a set of data. Knowing the run time of the algorithm may be useful in determining how long the computer system will be occupied and/or unavailable to perform other tasks. In addition, it may be useful for users to know how long they will have to wait for a result.

Similar to algorithms, oftentimes users wish to submit rules for evaluation on a given set of data or on the execution of an algorithm. Such rules are often tested or validated on a smaller subset of data than large active or live data. Traditionally, validation time was obtained by validating the rules on a sample of the data, then multiplying the validation time of that sample by the total amount of data. However, this method of calculation has many drawbacks. For example, the data may be differently sized, resulting in widely varying validation times. Thus, an estimation obtained by this method may be inaccurate with a high amount of error. Thus, improved systems and methods for estimating validation time are needed.

Users may also wish to estimate the amount of data fulfilling one or more conditions defined by an algorithm in order to make a decision or take some other action. One method for estimating the amount of matching data uses a histogram. The histogram divides the range of attribute values fulfilling the condition into buckets having equal widths. Then, the amount of data falling into each bucket can be counted. However, the histogram approach has shown poor performance, leading to error rates only marginally lower than random guessing.

These issues are particularly relevant to conditions and rules to be applied to transactions for predicting fraud. Fraudulent transactions are continuously on the rise, causing issuers and other authorizing entities to suffer losses in the millions of dollars. Effective rules and quick implementation of rules can prevent losses and reduce the number of false positives that can negatively affect users and organizations. Existing rule validation services experience the above described issues. Specifically, there is currently no or little visibility into how much time a rule set validation will take. In addition, executing rule sets with high validation times may deprive other users or organizations from using the service, or can make the service unavailable. Thus, improved systems and methods for estimating selectivity of conditions on a set of data are needed.

Embodiments of the invention address these and other problems, individually and collectively.

SUMMARY

Some embodiments of the present invention relate to systems and methods for estimating validation time that use an estimation of the amount of data fulfilling a rule or a set of rules. This provides for a number of advantages. For example, this estimation method may be more accurate because it considers how much data will match the rule versus how much data can be discarded. The disclosed systems and methods give visibility into how much time a rule set validation will take and how long the computer system will be unavailable due to the rule set being validated. This allows users to make better decisions about whether and when a rule set should be validated, and/or whether and how to modify implementation of the rule set. This results in faster rule validation response time, better metering of use, and avoidance of service downtimes.

According to some embodiments, a method is provided. The method comprises receiving a rule file from a remote computer at a server computer. The rule file includes a plurality of rules to apply to historical data. Each rule of the plurality of rules includes a plurality of criteria. The method further comprises retrieving the historical data from a database. The historical data includes a plurality of data files including a plurality of fields. The method further comprises estimating a rule selectivity for each rule using the plurality of criteria. The method further comprises calculating a validation time for each rule using the rule selectivity. The method further comprises generating an evaluation time for the rule file by combining the validation time for each rule of the plurality of rules. The evaluation time specifies a length of time to execute the rule file against the historical data. The method further comprises outputting the evaluation time to the remote computer.

Embodiments of the invention are further directed to a server computer comprising a processor and a memory element. The memory element can comprise code, executable by the processor, for implementing the above described method.

These and other embodiments of the invention are described in further detail below.

BRIEF DESCRIPTION OF THE DRAWINGS

FIG. 4 shows a screen shot of rules that may be applied according to some embodiments.

FIG. 7 shows a rule set executed on historical data according to some embodiments.

DETAILED DESCRIPTION

Figure 1:
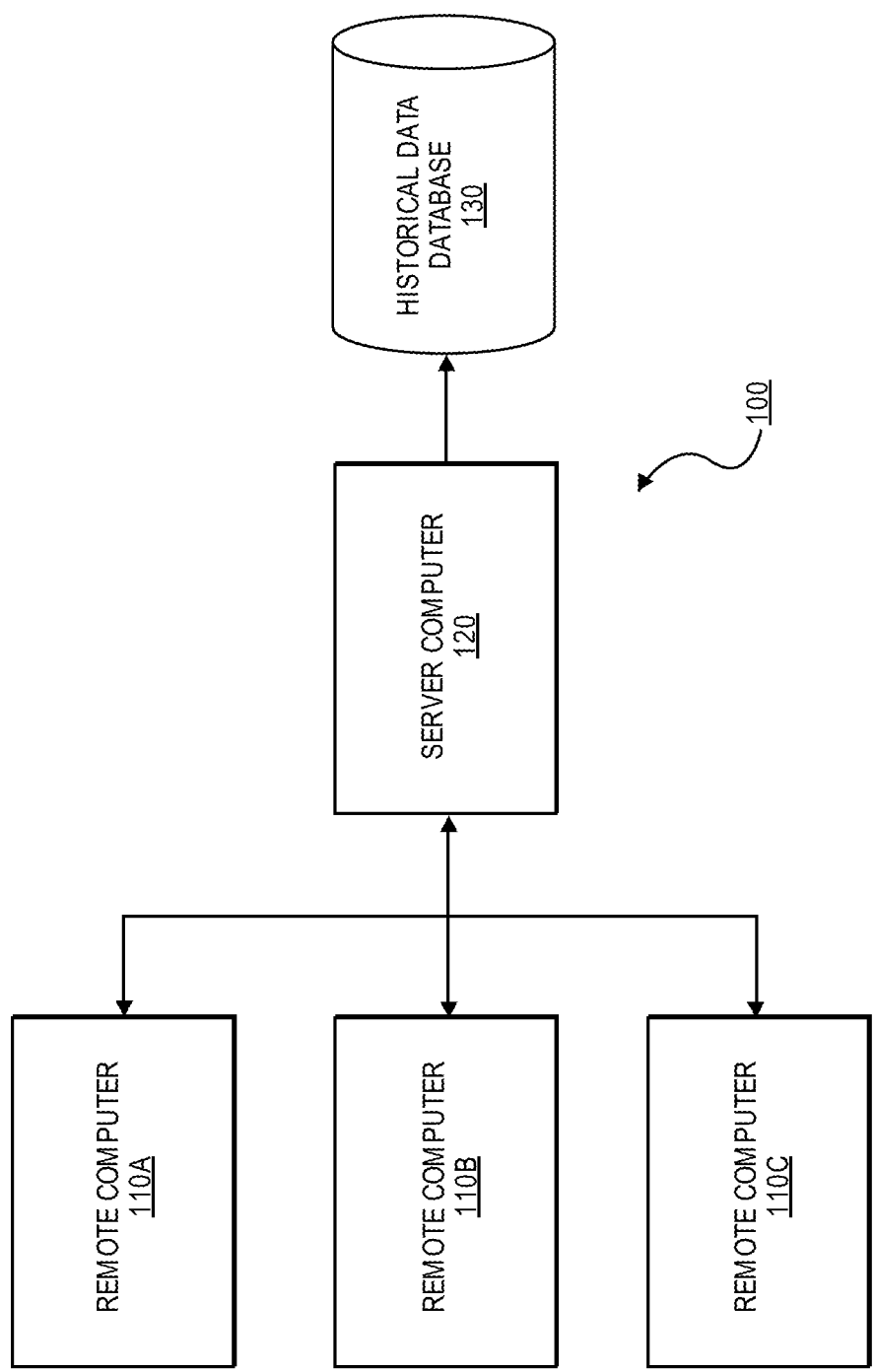
FIG. 1 shows a block diagram of a system according to some embodiments.

Embodiments of the invention are directed to systems and methods of estimating evaluation time of a rule file on a set of historical data. The rule file, which may contain a single or multiple rules for filtering the historical data, may be received from a remote computer. Each rule may have multiple criteria, such as, for example, yesterday's date and a certain amount. The historical data may be culled from a single source or from a variety of sources to obtain data files, usually in large quantities. The data files may be, for example, transactions. In that example, each transaction may have at least one field, such as a date, a transaction amount, a location, a resource provider name, and/or the like.

Once the rule file and the historical data is received, a rule selectivity may be estimated for each rule of the rule file. The rule selectivity may estimate the number of data files meeting the requirements of the rule file without actually counting the matching data files. In some embodiments, rule selectivity may be estimated using distribution steps, which can be described as histograms where buckets have equal height instead of equal width.

Once the rule selectivity has been estimated, known validation times for that amount of data may be used to estimate a validation time for each rule. These validation times may be combined to estimate a total evaluation time for the rule file, which specifies an estimated length of time it will take to filter the historical data with the rule file. This evaluation time may be output to the remote computer providing the rule file for further processing and/or decision making. For example, the remote computer may modify the rule file to reduce or increase the evaluation time of the rule file against the historical data, may decide not to execute the rule file against the historical data, may execute the rule file against a subset of the historical data to save time, or may execute the rule file against the historical data at a convenient and/or more efficient time.

Before discussing specific embodiments and examples, some descriptions of terms used herein are provided below.

"Criteria" may include information used to determine one or more pieces of historical data. In some embodiments, criteria may include an age, a size, a date range, an amount, a location, an issuer, or any other suitable attribute of a set of data. For example, criteria may specify that transactions occurring in the last 24 hours be retrieved. Criteria may be combined in some embodiments to develop a rule including multiple criteria, such as, for example, Jan. 1, 2018-Mar. 1, 2018, over $500, and outside of the United States.

"Historical data" may include any data or information that was previously collected and stored in a database or other suitable storage medium. Historical data may include any suitable number of data files. A "data file" may include a collection or set of one or more fields, together forming a record. Exemplary historical data may include historical transaction data files, including transaction amount and other fields, as well as a transaction outcome or determination (e.g., accepted, rejected as fraudulent, on hold, reported as fraudulent, etc.).

A "remote computer" may include any computer or cluster of computers located remotely with respect to another computer or cluster of computers. One exemplary remote computer may be a client computer.

A "rule" may include any procedure or definition used to determine historical data. In some embodiments, the rule may include one or more criteria.

A "rule file" may include a grouping of rules. In some embodiments, the rule file may indicate a group of rules which are defined by the same party. For example, a rule file to be validated on a set of transactions may be defined by an issuer. In some embodiments, rule files may also be used to group rules with some logical or hierarchical association. In some embodiments, a rule file may contain any suitable number of rules.

"Rule selectivity" may define a ratio of a number of data files of historical data that satisfy given criteria. For example, a rule may have first criteria specifying an amount greater than 500 and second criteria specifying a location outside New York, N.Y. If 10% of the data files meet both the first and the second criteria, the rule may have a rule selectivity of 10%.

An "evaluation time" may include a time for a rule file, or set of rules, to all be executed against the data files of historical data. The evaluation time may be obtained by adding the validation times for each rule of the rule file. For example, a rule file may have rule A and rule B. Rule A may specify first criteria over $100. Rule B may specify second criteria outside of the United States and third criteria for credit cards. The evaluation time for the rule file may be calculated by calculating the validation time for Rule A and the validation time for Rule B, then combining the two validation times.

A "sample" may be a portion of a whole. For example, a sample of historical data may include a percentage of the historical data, such as 10%, 20%, 25%, 50%, etc.

A "server computer" may include a powerful computer or cluster of computers. For example, a server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "validation time" may include a time for a single rule to be executed against the data files of historical data. For example, a rule may have first criteria specifying an amount of exactly $100 and second criteria specifying yesterday's date. The validation time for that rule would be the amount of time it takes to run that single rule through the historical data.

I. Systems

Various systems may be used to implement the methods of estimating validation time and evaluation time described herein. FIG. 1 shows a block diagram of a system 100 according to embodiments of the present invention. The system 100 includes remote computers 110A-110C, a server computer 120, and a historical data database 130. In some embodiments, the remote computers 110A-110C may be various authorizing entity computers, the server computer may be a transaction processing computer or fraud detection computer, and the historical data database 130 may be a conglomerate of processed transaction data collected by the remote computers 110A-110C and/or the server computer 120.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the Internet), using any suitable communications protocol.

A remote computer, such as remote computer 110A, may send a request to the server computer 120 to estimate evaluation time of a rule file against the historical data in the historical data database 130. The request may include the rule file, which may include one or more rules. Each rule may have one or more criteria to create the rule, such as criteria that the historical data must include in order to meet the rule. The evaluation time specifies a total length of time it will take to execute the rule file against the historical data, extracting the historical data that meets the requirements of the rule file.

Upon receipt of the request from remote computer 110A, server computer 120 may retrieve historical data from the historical data database 130. The historical data may be, for example, historical transaction data with known fraud outcomes, i.e., indicators of whether or not certain transactions were fraudulent. The historical data may include one or numerous data files, each data file having one or more fields of data defining the data file. For example, a transaction data file may include fields for transaction amount, transaction data, name of resource provider, type of resource provider, and a fraud indicator.

Figure 3:
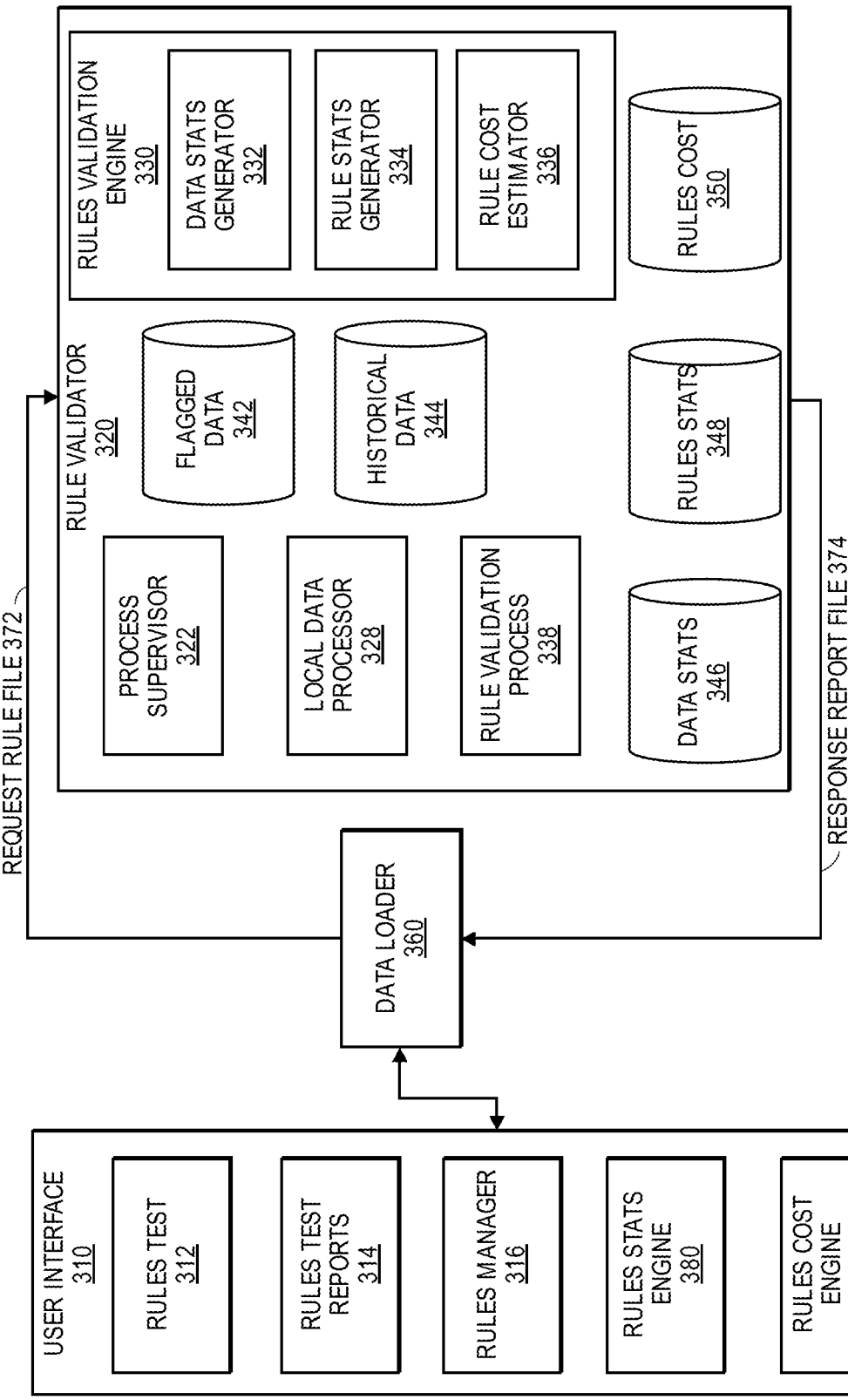
FIG. 3 shows a block diagram of another rule validation system according to some embodiments.
Figure 5:
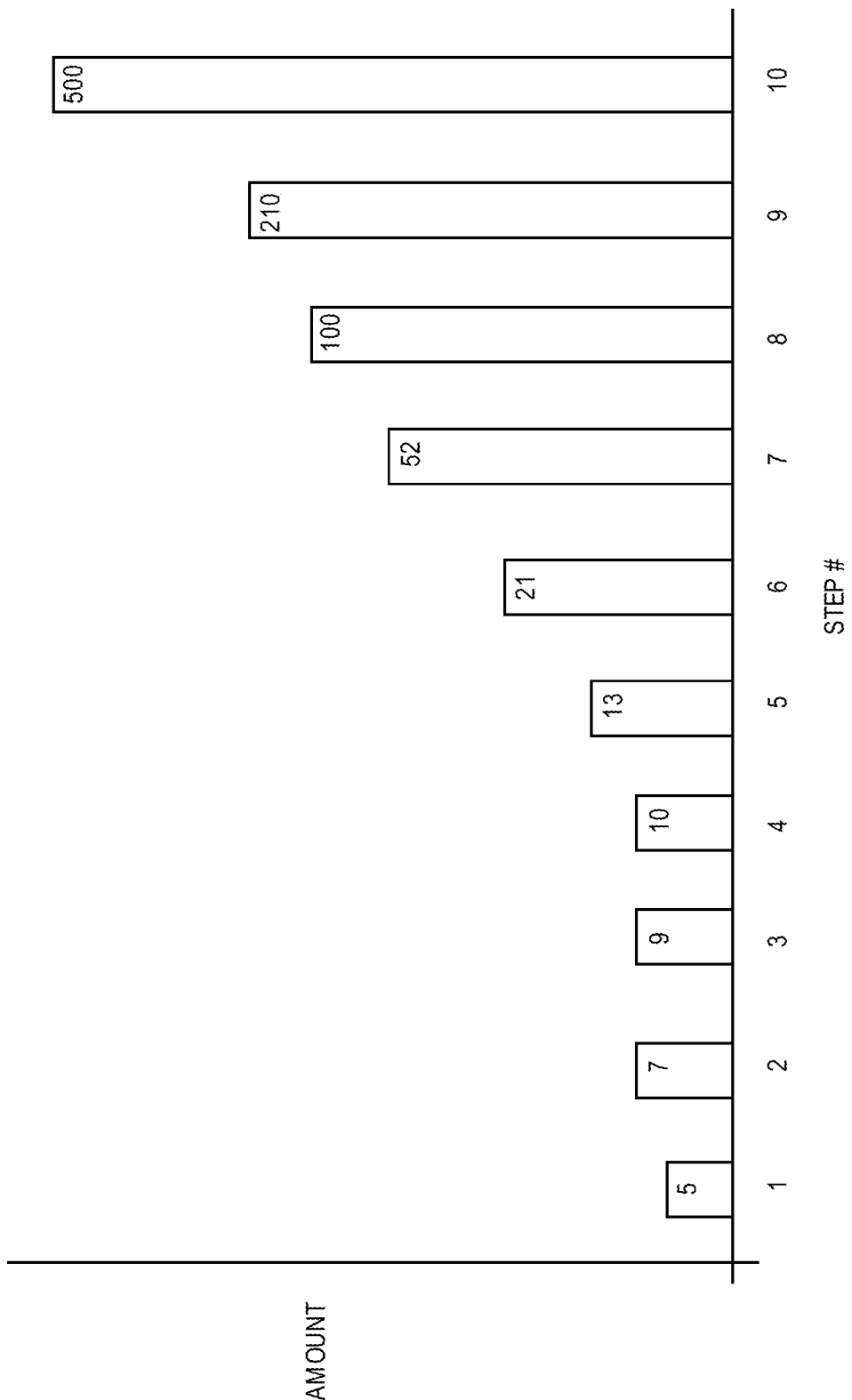
FIG. 5 shows a chart of distribution steps used to estimate selectivity according to some embodiments.

The server computer 120, in receipt of the rule file from the remote computer 110A and the historical data from the historical data database 130, may then estimate a rule selectivity for each rule using the plurality of criteria, as described further herein with respect to FIGS. 3 and 5. Once the rule selectivity is estimated, a validation time for each rule may be calculated by the server computer 120 using the rule selectivity. The validation time may be an estimated amount of time it will take to validate each rule against the historical data based on how much of the historical data will meet the criteria. These validation times may be combined by the server computer 120 to estimate a total evaluation time for the entire rule file.

This total evaluation time may be output by the server computer 120 to the remote computer 110A for further decision making, as described further herein. For example, the remote computer may modify the rule file to reduce or increase the evaluation time of the rule file against the historical data, may decide not to execute the rule file against the historical data, may execute the rule file against a subset of the historical data to save time, or may execute the rule file against the historical data at a convenient and/or more efficient time.

Figure 2:
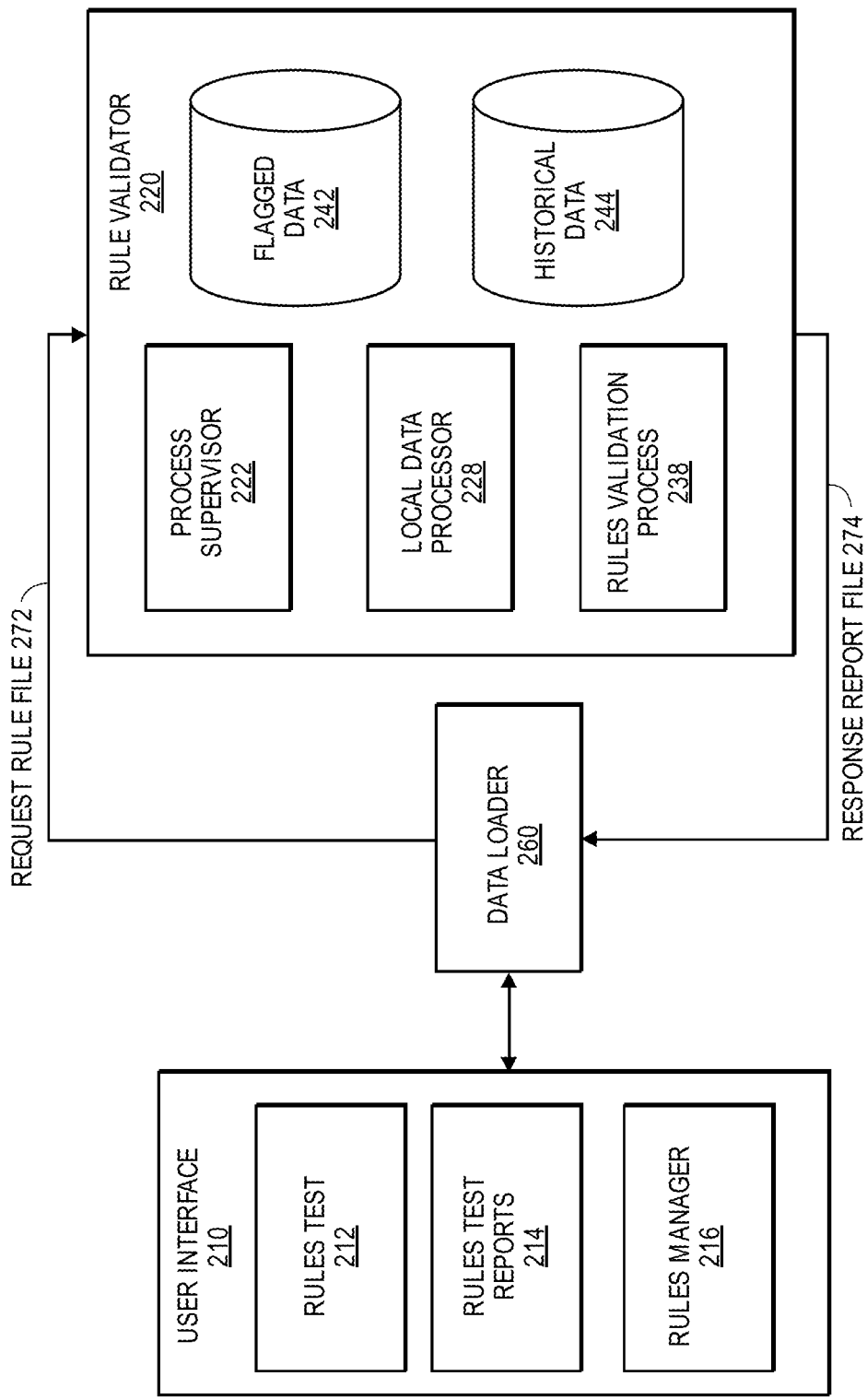
FIG. 2 shows a block diagram of a rule validation system according to some embodiments.

FIG. 2 shows a block diagram of a rule validation system according to some embodiments. Remote computers, such as one or more of remote computers 110A-C of FIG. 1, may connect to the rule validator 220 through a user interface 210. The rule validator 220 may be included in, for example, server computer 120 of FIG. 1. A rules manager 216 may be used to create rules for validation using the rules test 212. The results of the rules validation may be made available to the user interface 210 via the rules test reports 214.

The user interface 210 may communicate with the rule validator 220 using a data loader 260. The data loader 260 may submit a request including a rule file 272 received via user interface 210 to the rule validator 220. The data loader 260 further receives a response report file 274 responsive to the request 272 from the rule validator 220 to forward back to the user interface 210.

Flagged data 242 may be received (e.g., fraud data) from, for example, remote computers, clients, and/or other users, and stored in a database. Historical data 244 may be received (e.g., historical transaction data) may be obtained from a service (e.g., a transaction processing computer), and stored in a database.

The rule validator 220 may include a process supervisor 222, a local data processor 228, a rules validation process 230, a flagged data database 242, and a historical data database 244. In some embodiments, any or all of these components may be separate from, but in communication with, the rule validator 220. The process supervisor 222 may coordinate the various processes include the rule validator 220. The local data processor 228 may be responsible for the in-memory data processing needs of the rule validator 220. The rules validation process 238 may read flagged data from flagged data database 242 and historical data from historical data database 244 and perform the rules validation using the local data processor 228. The results of the rules validation may be provided as a response report file 274 to the data loader 260 to provide to the user interface 210.

Various components of FIG. 2, including the process supervisor 222, the rules validation process 238, the rules test 212, and the rules manager 216 may be software modules embodied on a computer readable medium that may be executed by a processor.

FIG. 3 shows a block diagram of another rule validation system according to some embodiments. The rule validation system of FIG. 3 adds two engines in the user interface 310 with respect to the user interface 210: a rules stats engine 380 and a rules cost engine 382. In order to provide these services to the user interface 210, the rule validation system implements the following in rule validator 320: a rules validation engine 330, a transaction stats generator 332 and transaction stats database 346, a rules stats generator 334 and a rules stats database 348, and a rules cost estimator 336 and a rules cost database 350.

The rules validation engine 330 may be responsible for providing the information needed to rules stats engine 380 and rules cost engine 382. The rules validation engine 330 may include the data stats generator 332, the rules stats generator 334, and the rules cost estimator 336.

Data in historical data database 344 may be used to generate statistics that get stored in data stats database 346. The data in historical data database 344 may contain many different fields, as shown in FIG. 4. Depending on whether a field is numeric or non-numeric, various statistics may be generated. For example, for a numeric field, the following statistics may be generated on the values of the field across multiple sets of data collected over a defined time period: number of values in the available data, number of distinct values in the available data, min and max values of the field, mean and standard deviation of values in the field, and/or equi-height histograms of value distribution.

When a remote computer submits a rule file for validation and defines the length of the time period in the historic data that should be used for validation, a variety of statistics may be generated over the rule files including: statistics over a single rule file, statistics over multiple versions of a rule file, and/or statistics over multiple rule files over a period of time. Examples of such statistics may include, but are not limited to: number of rules in a rule file, number of rule files tested over a period of time, number of rule files submitted for validation by multiple remote computer at one time, number of rules added to a rule file over a period of time, total number of rules a remote computer has created, and/or total number of active rules for a remote computer.

As shown in FIG. 4, a rule may include multiple criteria connected with AND and/or OR connectives, which may also be referred to as composition operators. Each criterion is of the form "field Op Value", for example, Age >16. "Op" may be one of the comparison or set operators. Examples of comparison operators include EQUALS, NOEQUALS, GREATERTHAN, GREATERTHANEQUALTO, LESSTHAN, LESSTHANEQUALTO, and BETWEEN. Examples of set operators include IN and NOTIN.

Thus, a criterion may be viewed as a simple predicate in relational algebra. If historical data is viewed in the form of a table and each field in the data as a column, the historical data may be viewed as a relational table. Thus, a criterion applied to a field of historical data may be analogous to a predicate on a table column.

According to some embodiments, methods are provided for estimating a number of tuples from a table that satisfy a given predicate or a composition of predicates. These methods may be used to estimate selectivity of a criterion (i.e., what percentage of historical data will meet a given criteria) and selectivity of a rule (i.e., what percentage of historical data will meet a rule comprising potentially multiple criteria). These methods are further described in the paper entitled "ACCURATE ESTIMATION OF THE NUMBER OF TUPLES SATISFYING A CONDITION", by Gregory Piatetsky-Shapiro and Charles Connell, 1984.

For single criterion selectivity, selectivity estimates may be made for the following conditions: Field=Value, Field >Value, Field >=Value, Field <Value, Field <=Value. In one example specific to historical transaction data, selectivity may be defined as the ratio of number of transactions satisfying the criterion to the total number of transactions in the dataset. This estimate of selectivity of a predicate over a column may be determined using equi-height histograms (also referred to herein as "distribution steps") on values of the column in a table.

This estimation process is described with respect to FIG. 5. FIG. 5 shows a chart of distribution steps used to estimate selectivity according to some embodiments. To compute the distribution steps, the values of fields are collected from all of the historical data in some embodiments. In some embodiments, the values of fields are collected from a sample of the historical data. The values may then be sorted in ascending order.

Depending on the desired accuracy and available storage, a number of distribution steps may be selected. FIG. 5 illustrates 10 distribution steps numbered from 1 to 10. In general, the more distribution steps used, the higher the accuracy, but the more storage will be used. Positions within the values may be selected such that there are the same number of values between any two successive positions. For example, in FIG. 5, 100 transactions may be illustrated. The 100 transactions may be placed in ascending order and divided into 10 equal amounts. Thus, at step 1, the position might be "10"; at step 2, the position might be "20"; at step 3, the position might be "30", and so on and so forth. Thus, step 1 may include the first 10 ordered transactions, step 2 may include the second 10 ordered transactions, step 3 may include the third 10 ordered transactions, and so on and so forth.

To estimate the selectivity of a certain criteria, e.g., an amount less than $75, "75" may be located to find out where it falls relative to the distribution steps. Step 7 equals 52, so we know that more than 69 transactions are $52 or lower. Thus, the selectivity of a value less than 75 is greater than 0.69. Step 8 equals 100, so we know that 79 or fewer transactions are $100 or lower. Thus, the selectivity of a value less than 75 is less than or equal to 0.79. Therefore, the selectivity of an amount less than $75 is greater than 0.69 and less than or equal to 0.79. Choosing the midpoint of that range (0.74) as an estimate of the selectivity of a value less than 75, the maximum possible error is 0.05. This error is significantly lower than other methods of estimating selectivity.

Rule selectivity may be the same as selectivity of corresponding composite criteria. The selectivities of composite criteria may be evaluated according to the following equations. For example, for a rule that has two criteria, C1 and C2, individual selectivities of each of these criteria may be Sc1 and Sc2. Thus:

$$\text{Selectivity}(C1 \text{ AND } C2) = Sc1 \& Sc2 = Sc1 * Sc2 \tag{1}$$

$$\text{Selectivity}(C1 \text{ OR } C2) = Sc1 + Sc2 - Sc1 * Sc2 \tag{2}$$

To convert rule selectivity into validation time for that rule, the amount of historical data satisfying the rule may be calculated according to the following equation:

$$Nt = \text{Selectivity} * \text{total amount of historical data}, \tag{3}$$

Wherein Nt represents the amount of historical data satisfying the rule. Continuing the above example of FIG. 5, a selectivity of 0.74 multiplied by a total amount of transactions (e.g., 1000, if FIG. 5 represents a sample) results in an Nt of 740 transactions.

Letting Tr represent an empirically determined average per historical data validation time for rule validation, the validation time for evaluating the rule may be represented by:

$$Tri = Tr * Nt \tag{4}$$

Wherein Tri represents the validation time for evaluating the rule.

To convert validation time into a cost of evaluating a rule, the following equation may be used:

$$Ci = Tri * C1 \tag{5}$$

Wherein C1 represents the cost of spending one second on the rule validator 320 and Ci represents the cost of evaluating a rule. The rule file cost may be defined as the sum of the costs of individual rules, Ci, over all the rules in the rule file.

The evaluation time for a data file may depend on the mode in which the rule file is run on the rule validator 320. If the rule file is evaluated one rule at a time sequentially, the total rule file evaluation time may be the sum of individual rule validation times for all of the rules in the rule file. However, if the rules are evaluated in parallel, the evaluation time for the rule file may be the maximum of all of the rule validation times over all of the rules in the rule file. This computation may enable the server computer operating the rule validator 320 to manage the workload in the rule validator 320 and charge remote computers based on the speed of validation they select.

Returning to FIG. 3, the statistics generated by data stats generator 332 may be stored in the data statistics database 346. The data statistics database 346 may further provide the data to rules statistics engine 380 and rules cost engine 382. The statistics generated by rule stats generator 334 may be stored in the rules statistics database 348. The rules statistics database 348 may further provide the data to the rules statistics service 380 and the rules cost service 382. The costs generated by rule cost estimator 336 may be stored in the rules cost database 350. The rules cost database 350 may provide the data to the rules statistics engine 380 and the rules cost engine 382.

The rules statistics engine 380 may provide APIs to access the statistics generated by the rule stats generator 334. The rules statistics engine 380 may obtain the statistics from the rules stats database 348. The rules cost engine 382 may provide rule validation time estimates as described further herein, such as estimates of how much total evaluation time is needed to execute the rule file before starting the execution, and estimates of how much remaining time is needed for completion while the rule file is being executed on the historical data.

Various components of FIG. 3, including the process supervisor 322, the rules validation process 338, the rules validation engine 330, the data stats generator 332, the rule stats generator 334, the rule cost estimator 336, the rules test 312, the rules manager 316, and the rules cost engine 382 may be software modules embodied on a computer readable medium that may be executed by a processor.

II. Methods

Figure 6:
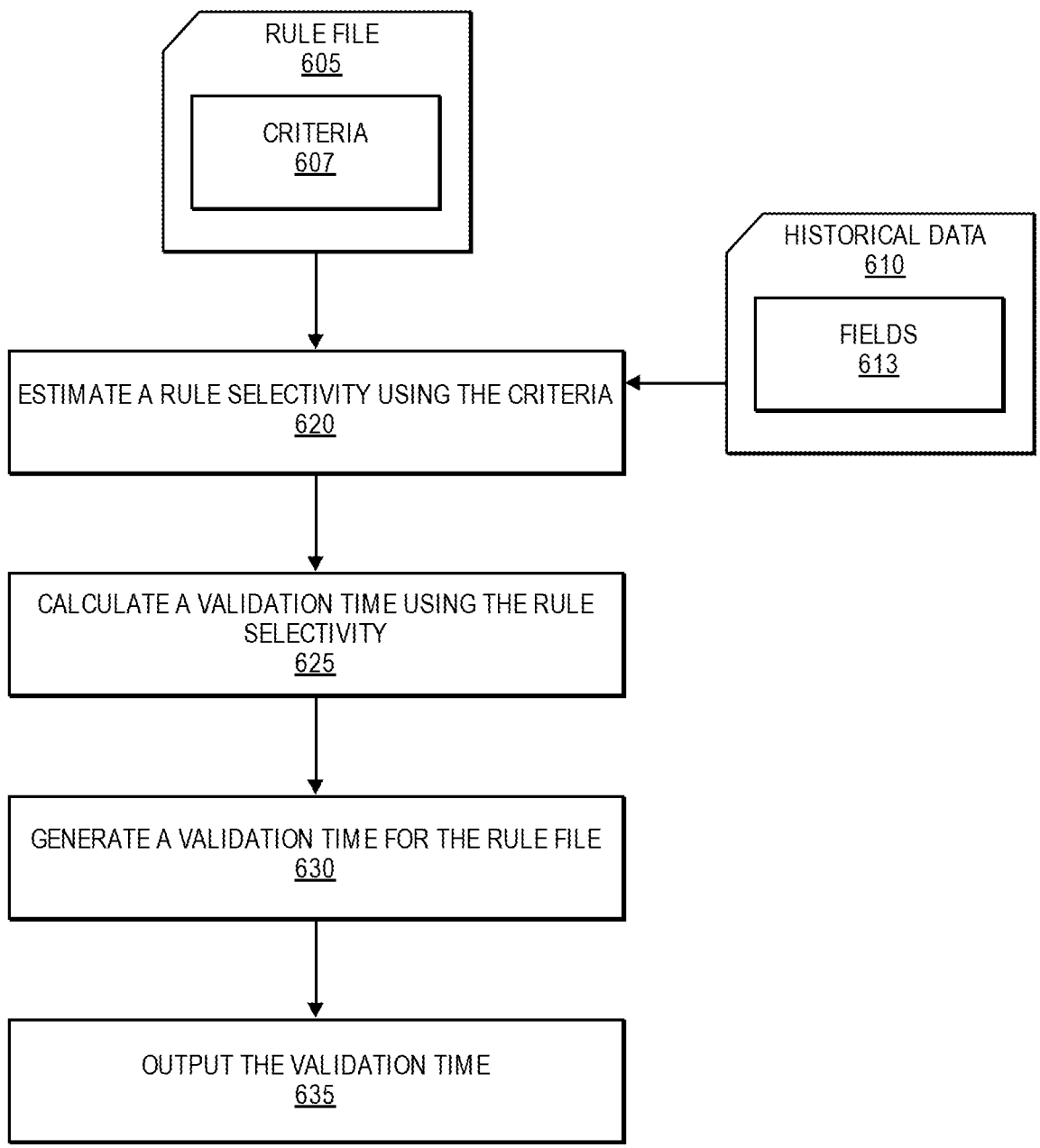
FIG. 6 shows a flow chart of a method for estimating validation time according to some embodiments.

A method according to embodiments of the invention can be described with respect to FIG. 6, which shows a flowchart of a method for estimating evaluation time of a rule file on a set of data. A rule file 605 is received from a remote computer at a server computer. The rule files include rules to apply to historical data 610. The rules include criteria 607. Historical data 610 is retrieved from a database. The historical data 610 includes data files (e.g., transaction data) having fields (e.g., amounts, dates, times, locations, etc.).

At step 620, a rule selectivity may be estimated using the criteria. The rule selectivity may define a ratio of a number of data files of the total number of data files that satisfy the criteria. Selectivity may be estimated by taking the historical data 610 and dividing it amongst distribution steps, as described with respect to FIG. 5. The distribution steps may define values for the criteria using the fields of the historical data.

As discussed further herein, the distribution steps may be considered a histogram defining buckets of values for the criteria using the fields. The buckets of values may have equal height as opposed to equal width. In other words, the buckets of values are defined by a constant number of values at each distribution step, as opposed to being defined by the fulfillment of certain criteria regardless of the number of values.

In some embodiments, only a sample of the historical data 610 may be divided amongst distribution steps. Using a sample may be beneficial in that computing the distribution steps for even one criteria of a large dataset may be time consuming, inefficient, and expensive. Although guaranteed precision may be lost using a sample, very high accuracy with respect to other estimation methods may be maintained. In some embodiments, the maximum error for the rule selectivity may also be calculated, which, as discussed herein, is generally at a maximum of 0.05.

At step 625, a validation time may be calculated for each rule using the rule selectivity according to equation (4). At step 630, an evaluation time for the rule file may be generated, which in some embodiments, combines the individual validation times for each rule. In some embodiments, the evaluation time for the rule file may be the longest time of each of the validation times, such as if the rules are executed against the historical data in parallel. At step 635, the evaluation time may be output to the remote computer. This may allow the remote computer to make better decisions about whether and when a rule set should be evaluated, and/or whether and how to modify implementation of the rule set. This results in faster rule validation response time, better metering of use, and avoidance of service downtimes.

In some embodiments, the remote computer may also choose whether to evaluate a rule file and/or which rule file to evaluate based on the reported run time and/or subjective criteria. For example, the remote computer may be considering rule file A, which provides high quality results, but has a very high evaluation time, or rule file B, which provides medium quality results, but has a very low evaluation time. Based on this information, the remote computer may choose to evaluate rule file B against the historical data.

As described herein, some embodiments of the invention may be used to estimate validation times for executing fraud rules against historical transaction data. Fraud rules may be rules that may be used to automatically detect fraudulent activity. For example, fraud rules may be used to determine if a payment transaction is fraudulent or if an account has been compromised. Fraud rules may be evaluated by an authorizing entity computer, a transaction processing computer, or a transport computer. If a fraudulent transaction is detected, a fraud rule may reject a transaction, flag the transaction for human review, or approve/reject and log the transaction.

The described embodiments provide for a number of advantages. For example, this estimation method may be more accurate because it considers how much data will match the rule without actually evaluating the rule. The disclosed systems and methods give visibility into how much time a rule set validation will take and how long the computer system will be unavailable due to the rule set being validated. This allows users to make better decisions about whether and when a rule set should be evaluated, and/or whether and how to modify implementation of the rule set. This results in faster average rule validation response time, better metering of use, and avoidance of service downtimes.

FIG. 7 illustrates an exemplary rule file report 1200 generated by a rule validator (e.g., rule validator 320) using criteria specified by a remote computer according to some embodiments. The rule file report of FIG. 7 may be generated after the rule file is executed against the historical transaction data, i.e., after the evaluation time has been estimated and the remote computer has instructed the rule validator to proceed. In FIG. 12, a remote computer specifies a criterion for transactions occurring the previous day. Accordingly, the rule validator determines the number of transactions occurring yesterday to be 1720, as reflected by transaction total 1211. The rule validator also determines transaction outcomes for the determined transactions. In the shown example, accepted transaction outcome 1225 is one possible transaction outcome. Accepted transaction outcome 1225 has a corresponding accepted transaction outcome frequency value 1231 of 1127, indicating that 1127 of the 1720 transactions conducted yesterday were accepted. Analogously, accepted transaction outcome frequency percentage 1227 is 65.52%, reflecting the percentage of the transaction total that corresponds to an accepted transaction (i.e., 1127/1720=65.52%). Rule file report 1200 similarly includes transaction outcomes, transaction outcome frequency values, and transaction outcome frequency percentages for transactions with "Force Accepted", "Rejected", and "Review" transaction outcomes. In the shown example, the sum of all transaction outcome frequency values is equal to the transaction total 1211.

Rule file report 1200 may also display transaction outcome dispositions and transaction outcome disposition frequencies. For example, rejected transaction outcome disposition 1228 has a corresponding rejected transaction outcome disposition frequency value 1229 of 281, indicating that 281 of 1720 transactions conducted yesterday had a transaction disposition of "Rejected". Rule file report 1200 similarly includes transaction outcome dispositions and transaction outcome disposition frequencies for transactions with a disposition of "Accepted" and a disposition of "MAS". In some embodiments, a transaction outcome disposition of "MAS" may indicate that the transaction should be "marked as suspect". In some embodiments, not all transactions may have a transaction outcome disposition. For example, transactions which have not been confirmed as fraudulent or paid for by the user may not be assigned a transaction outcome disposition.

A computer system may be used to implement any of the entities or components described above. The subsystems of the computer system may be interconnected via a system bus. Additional subsystems such as a printer, keyboard, fixed disk (or other memory comprising computer readable media), monitor, which is coupled to display adapter, and others may be used. Peripherals and input/output (I/O) devices, which couple to an I/O controller (which can be a processor or other suitable controller), can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium. In some embodiments, the monitor may be a touch sensitive display screen.

A computer system can include a plurality of the same components or subsystems, e.g., connected together by an external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents. For example, although specific functions and methods have been described with respect to transaction processing computer 120 in FIG. 6, such functions could be performed by other computers such as the authorizing entity computer 140.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed:

1. A method comprising:
    receiving a rule file from a remote computer at a server computer, wherein the rule file includes a plurality of rules to apply to historical data, and wherein each rule of the plurality of rules includes a plurality of criteria;
    retrieving the historical data from a database, wherein the historical data includes a plurality of data files including a plurality of fields;
    estimating a rule selectivity for each rule using the plurality of criteria;
    calculating a validation time for each rule using the rule selectivity;
    generating an evaluation time for the rule file by combining the validation time for each rule of the plurality of rules, wherein the evaluation time specifies a length of time to execute the rule file against the historical data; and
    outputting the evaluation time to the remote computer.

2. The method of claim 1, wherein the rule selectivity is estimated using distribution steps, and wherein the distribution steps define values for the plurality of criteria using the plurality of fields.

3. The method of claim 1, wherein the rule selectivity is estimated using a histogram, and wherein the histogram defines buckets of values for the plurality of criteria using the plurality of fields.

4. The method of claim 3, wherein the buckets of values have equal height.

5. The method of claim 1, further comprising:
    calculating a maximum error for the rule selectivity.

6. The method of claim 1, wherein the plurality of fields are a sample of the historical data.

7. The method of claim 1, wherein the rule file is received from the server computer via a user interface.

8. The method of claim 1, wherein each field of the plurality of fields includes a value, and wherein the value is numeric or non-numeric.

9. The method of claim 1, wherein the rule selectivity defines a ratio of a number of data files of the plurality of data files that satisfy the plurality of criteria.

10. A server computer comprising:
    a processor; and
    a memory element comprising code, executable by the processor, for implementing a method comprising:
    receiving a rule file from a remote computer, wherein the rule file includes a plurality of rules to apply to historical data, and wherein each rule of the plurality of rules includes a plurality of criteria;
    retrieving the historical data from a database, wherein the historical data includes a plurality of data files including a plurality of fields;

estimating a rule selectivity for each rule using the plurality of criteria;

calculating a validation time for each rule using the rule selectivity;

generating an evaluation time for the rule file by combining the validation time for each rule of the plurality of rules, wherein the evaluation time specifies a length of time to execute the rule file against the historical data; and outputting the evaluation time to the remote computer.

11. The server computer of claim 10, wherein the rule selectivity is estimated using distribution steps, and wherein the distribution steps define values for the plurality of criteria using the plurality of fields.

12. The server computer of claim 10, wherein the rule selectivity is estimated using a histogram, and wherein the histogram defines buckets of values for the plurality of criteria using the plurality of fields.

13. The server computer of claim 12, wherein the buckets of values have equal height.

14. The server computer of claim 10, the method further comprising:

calculating a maximum error for the rule selectivity.

15. The server computer of claim 10, wherein the plurality of fields are a sample of the historical data.

16. The server computer of claim 10, wherein the rule file is received from the server computer via a user interface.

17. The server computer of claim 10, wherein each field of the plurality of fields includes a value, and wherein the value is numeric or non-numeric.

18. The server computer of claim 10, wherein the rule selectivity defines a ratio of a number of data files of the plurality of data files that satisfy the plurality of criteria.

* * * * *